US008891098B2

(12) United States Patent
Segawa et al.

(10) Patent No.: US 8,891,098 B2
(45) Date of Patent: Nov. 18, 2014

(54) CONVERSION TIME PREDICTION APPARATUS, RECORDING MEDIUM, AND CONVERSION TIME PREDICTION METHOD (71) Applicant: Dainippon Screen MFG. Co., Ltd., Kyoto (JP)

(72) Inventors: Hiroyuki Segawa, Kyoto (JP); Kohei Ueda, Kyoto (JP)

(73) Assignee: Dainippon Screen Mfg. Co., Ltd., Kyoto-Shi (JP)

( * ) Notice: Subject to any disclaimer, the term of this patent is extended or adjusted under 35 U.S.C. 154(b) by 0 days.

(21) Appl. No.: 14/036,801

(22) Filed: Sep. 25, 2013

(65) Prior Publication Data
US 2014/0085657 A1 Mar. 27, 2014

(30) Foreign Application Priority Data

Sep. 26, 2012 (JP) ................................ 2012-211918

(51) Int. Cl.
G06F 3/12 (2006.01)
G06F 15/00 (2006.01)
G06F 1/00 (2006.01)
G06K 15/00 (2006.01)

(52) U.S. Cl.
CPC ............ G06F 3/1298 (2013.01); *G06F 3/1236* (2013.01); *G06F 3/1247* (2013.01); *G06F 3/1206* (2013.01); *G06F 3/1204* (2013.01); G06F 3/1211 (2013.01); G06F 3/1243 (2013.01); G06F 3/1244 (2013.01); *G06F 3/1256* (2013.01); G06F 3/1285 (2013.01)
USPC ......... 358/1.13; 358/1.16; 358/1.1; 358/1.15; 358/1.17; 358/1.9

(58) Field of Classification Search
None
See application file for complete search history.

(56) References Cited

U.S. PATENT DOCUMENTS

| 6,100,998 | A | 8/2000 | Nagao et al. |
| 8,576,435 | B2 * | 11/2013 | Miyazaki .................... 358/1.16 |
| 8,736,876 | B2 * | 5/2014 | Hayakawa .................. 358/1.15 |
| 2007/0291294 | A1 * | 12/2007 | Suzuki ......................... 358/1.13 |
| 2012/0062913 | A1 | 3/2012 | Yabe |

FOREIGN PATENT DOCUMENTS

EP 1300754 A2 4/2003
JP 2002-182875 A 6/2002

OTHER PUBLICATIONS

European Search Report EP Application No. 13 18 1132.5 dated Apr. 4, 2014.

* cited by examiner

*Primary Examiner* — Satwant Singh
(74) *Attorney, Agent, or Firm* — McDermott Will & Emery LLP (57) ABSTRACT Page-group data indicating many pages is analyzed to acquire the degree of reuse of page components as an analysis result. A set of page data pieces in the page-group data is acquired as a data block, the number of the pieces corresponding to a unit page number that is the number of pages to be processed collectively as a single task when a conversion processor in a system actually converts the page-group data into drawing data. A predetermined conversion processor converts the data block into drawing data to acquire a conversion processing time. A predicted value of a conversion processing time required for the conversion processor in the system to actually convert the page-group data is accurately obtained using the conversion processing time of the data block. An operator is notified of the analysis result and the predicted value and can easily ascertain the appropriateness of the page-group data.

15 Claims, 7 Drawing Sheets

CONVERSION TIME PREDICTION APPARATUS, RECORDING MEDIUM, AND CONVERSION TIME PREDICTION METHOD

TECHNICAL FIELD

The present invention relates to a technique for predicting a conversion processing time required for a conversion processor provided in an image forming apparatus to convert plane group data indicating a large number of image planes into drawing data for forming images.

BACKGROUND ART

Printing a different print content on each page (called "variable data printing") is a conventional practice, such as in the case of printing credit card bills or the like. In the variable data printing, rasterization (hereinafter, referred to as "RIP processing") is performed on received data to generate raster data while images are being consecutively printed on objects such as printing paper in accordance with the raster data. Recent improvements in the printing speeds of printers have increased the demand for higher RIP processing speed.

The received data, which is page group data indicating many pages, is written in a page description language such as PostScript (registered trademark) or Portable Document Format (PDF). A page data piece indicating each page in the page group data in PDF format (part of the page group data) uses a plurality of page components. These page components are in such a nested relationship that one page component uses another page component and the other page component uses yet another page component. Japanese Patent Application Laid-Open No. 2002-182875 (Document 1) discloses a method of predicting rasterization time required for each job on the basis of the number of each type of drawing instructions included in data of the job, and figure size information.

Meanwhile, the nested relationship among page components may become complicated irrespective of the intentions of a data producer due to, for example, the way of using desktop publishing (DTP) software in generating page group data in PDF format. For instance, with page group data in which page components are nested to many hierarchical levels, the speed of RIP processing using Adobe PDF Print Engine (APPE) or the like may be reduced or the RIP processing may be terminated due to an error. With the method of Document 1, it may be difficult to accurately obtain a predicted value of a conversion processing time for converting page group data because factors such as transparency effects and the nested relationship among page components are not taken into consideration. In addition, obtaining only a predicted value of the conversion processing time is insufficient for an operator to ascertain the appropriateness of page group data (also referred to as "plane group data").

SUMMARY OF INVENTION

The present invention is intended for a conversion time prediction apparatus for predicting a conversion processing time required for a conversion processor provided in an image forming apparatus to convert plane group data indicating many image planes into drawing data for forming images, and it is an object of the present invention to accurately obtain a predicted value of a conversion processing time of the plane group data and to enable an operator to easily ascertain the appropriateness of the plane group data.

The conversion time prediction apparatus according to the present invention includes a target data analysis part for analyzing target data to acquire a degree of reuse of a plane component in the target data as an analysis result, the target data being the plane group data or a set of plane data pieces constituting part of the plane group data, and the plane component being included in the plane group data and reusable in a plane data piece indicating each image plane, a data block acquisition part for acquiring a set of plane data pieces in the target data as a data block, the number of the set of plane data pieces corresponding to a unit plane number that is the number of planes equal to or close to the number of planes to be processed collectively as a single task when a conversion processor provided in an image forming apparatus actually converts the plane group data into drawing data for forming images, a conversion processing control part for causing a predetermined conversion processor to convert the data block into drawing data for forming images to acquire a conversion processing time, a conversion time calculation part for obtaining a predicted value of a conversion processing time required for the conversion processor provided in the image forming apparatus to actually convert the plane group data into drawing data for forming images, on the basis of the conversion processing time of the data block acquired by the predetermined conversion processor, and a notification part for notifying an operator of the analysis result and the predicted value.

According to the present invention, the predicted value of the conversion processing time of the plane group data can be obtained accurately, and an operator can be notified of the predicted value of the conversion processing time and the degree of reuse of plane components in the plane group data. This enables the operator to easily ascertain the appropriateness of the plane group data.

In a preferred embodiment of the present invention, when the number of a plurality of plane data pieces included in the target data is smaller than the unit plane number, the target data analysis part copies the plurality of plane data pieces while replacing plane components that are not reused in the plurality of plane data pieces by new plane components that are not reused, to generate new target data that is a set of plane data pieces the number of which is greater than or equal to the unit plane number. The predicted value of the conversion processing time can thus be acquired with high accuracy even if the number of plane data pieces included in the target data is smaller than the unit plane number.

In another preferred embodiment of the present invention, when a plane component to be reused in the target data differs between a plurality of plane data pieces indicating a plurality of consecutive image planes and another plurality of plane data pieces indicating another plurality of consecutive image planes, the data block acquisition part acquires the data block from the plurality of plane data pieces and acquires another data block from the other plurality of plane data pieces. This enables the operator to be notified of a predicted value of the conversion processing time for each job.

In an aspect of the present invention, when the predetermined conversion processor is different from the conversion processor provided in the image forming apparatus, the conversion time calculation part obtains the predicted value of the conversion processing time by multiplying the conversion processing time of the data block acquired by the predetermined conversion processor by a preset coefficient.

Preferably, the plane group data is written in a page description language, and the drawing data for forming images is raster data.

The present invention is also intended for a non-transitory computer-readable recording medium storing a program for causing a computer to predict a conversion processing time required for a conversion processor provided in an image forming apparatus to convert plane group data indicating many image planes into drawing data for forming images, and is also intended for a conversion time prediction method for predicting a conversion processing time.

These and other objects, features, aspects and advantages of the present invention will become more apparent from the following detailed description of the present invention when taken in conjunction with the accompanying drawings.

DESCRIPTION OF EMBODIMENTS

Figure 1:
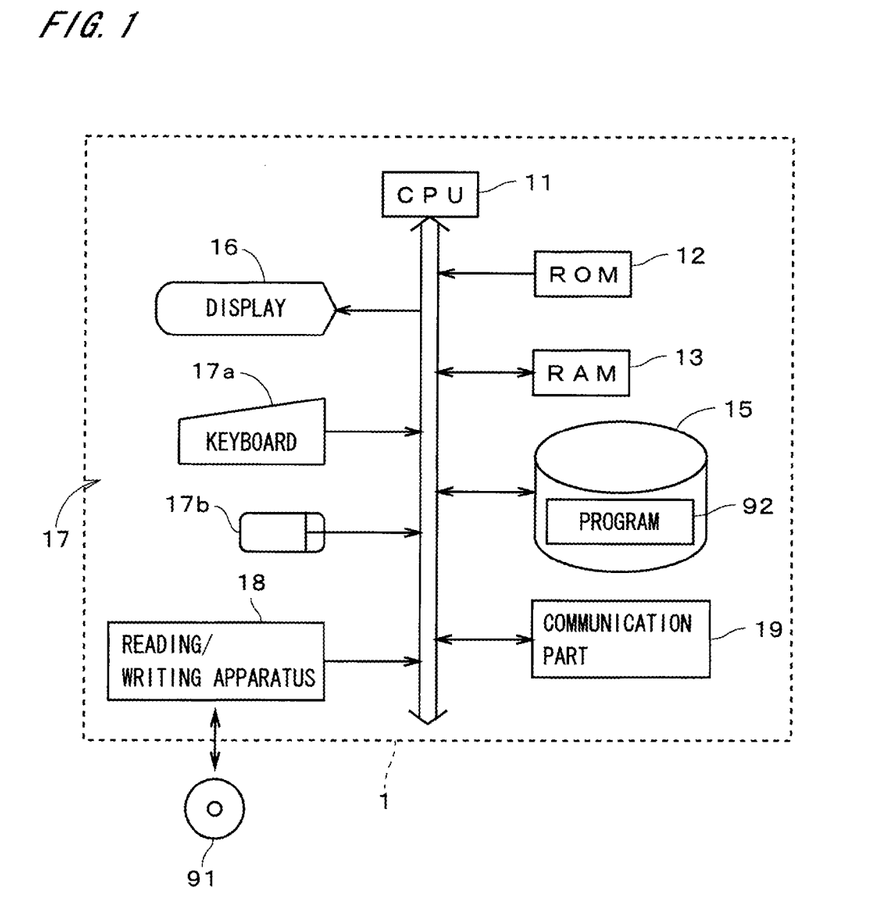
FIG. 1 illustrates a configuration of a computer.

FIG. 1 illustrates a configuration of a computer 1 according to an embodiment of the present invention. As illustrated in FIG. 1, the computer 1 is configured as a typical computer system in which a CPU 11 performing various types of arithmetic processing, a ROM 12 storing a basic program, and a RAM 13 storing various types of information are connected to a bus line. The bus line is further connected via an interface (I/F) or the like as appropriate to a fixed disk 15 storing information, a display 16 displaying various types of information, a keyboard 17a and a mouse 17b (hereinafter, collectively referred to as "input unit 17") that receive input from an operator, a reading/writing apparatus 18 that reads and writes information from and to a computer-readable recording medium 91 such as an optical disk, a magnetic disk, or a magneto-optical disk, and a communication part 19 for communicating with external devices.

The computer 1 causes the reading/writing apparatus 18 to read out a program 92 from the recording medium 91 and store the program 92 in the fixed disk 15 in advance. The program 92 is then copied to the RAM 13, and the CPU 11 executes arithmetic processing in accordance with the program stored in the RAM 13 (i.e., the computer executes the program). This allows the computer 1 to perform processing as a conversion time prediction part described later.

Figure 2:
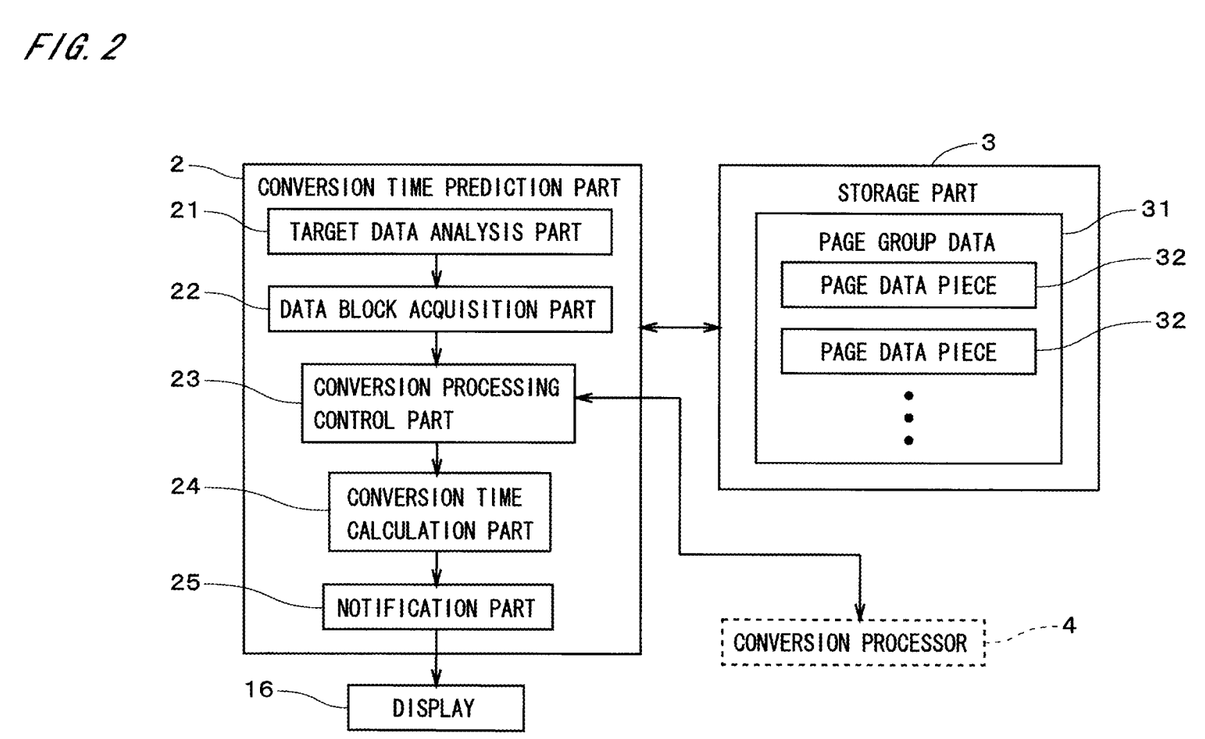
FIG. 2 is a block diagram illustrating a functional configuration implemented by the computer.

FIG. 2 is a block diagram illustrating a functional configuration implemented by the computer 1. A storage part 3 stores page group data 31 written in a page description language and indicating many pages. The page group data 31 includes pieces of page data (page data pieces) 32, each indicating one of the pages. A conversion time prediction part 2 includes a target data analysis part 21, a data block acquisition part 22, a conversion processing control part 23, a conversion time calculation part 24, and a notification part 25. FIG. 2 also illustrates a conversion processor 4 that is a function implemented by another computer as a broken-line rectangle. The details of these constituent elements will be described later. The function of the conversion time prediction part 2 may be implemented using a dedicated electrical circuit, or a dedicated electrical circuit may be used as part of the page data generation part 2.

Now, the content of the page group data 31 will be described. The page group data 31 is generated in advance using predetermined DTP software and is stored in the storage part 3. The page group data 31 includes the page data pieces 32, each indicating one of many (e.g., several tens of thousands to several hundreds of thousands of) pages, and page images of these pages are different in whole or in part from one another. In this embodiment, the page group data 31 is, for example, Portable Document Format (PDF) data.

Figure 3:
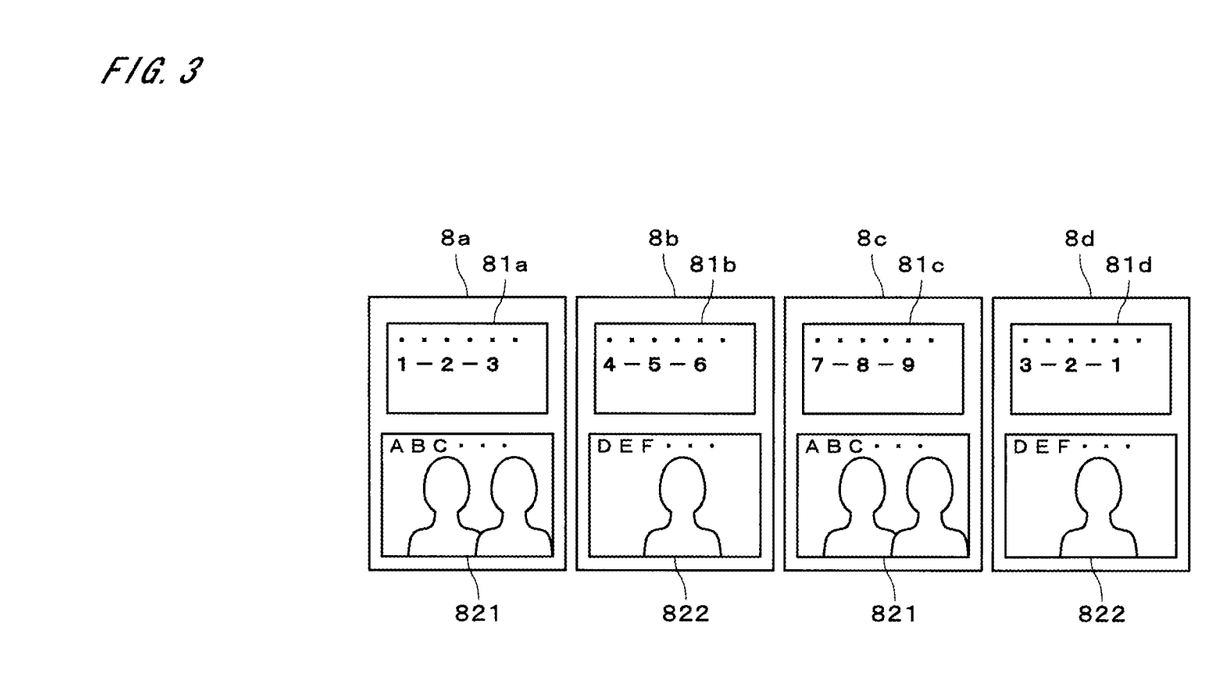
FIG. 3 illustrates page images.

FIG. 3 illustrates page images 8a, 8b, 8c, and 8d indicated by a plurality of page data pieces 32 included in the page group data 31. The page images 8a to 8d illustrated in FIG. 3 are, for example, images for direct mail. The page data pieces 32 each use a plurality of page components. In other words, referring to an image indicated by each page component as a component image, each of the page images 8a to 8d is represented by a plurality of component images. To be more specific, component images denoted by 81a, 81b, 81c, and 81d in the page images 8a to 8d in FIG. 3 are each indicated by a page component (hereinafter, referred to as a "variable component") that is used only once in the page group data 31, i.e., the content of which differs from page to page. The component images 81a to 81d indicated by the variable components unique to the respective pages are, for example, character strings indicating addresses.

Component images denoted by 821 and 822 in the page images 8a to 8d in FIG. 3 are indicated by page components (hereinafter, also referred to as "reusable components") that are used multiple times in the page group data 31, i.e., that are reusable in a plurality of page data pieces 32 (for page group data in PDF format, the reusable components correspond to "XObject"). The component images 821 and 822 indicated by these reusable components are, for example, photographic images representing specific products, or character strings containing a description of products or the like. In the example of FIG. 3, the page images 8a to 8d each include one of the two types of component images 821 and 822. The page group data 31 includes a plurality of reusable components, and in actuality, the reusable components representing the component images 821 and 822 in FIG. 3 use a plurality of other reusable components having a nested relationship.

Figure 4:
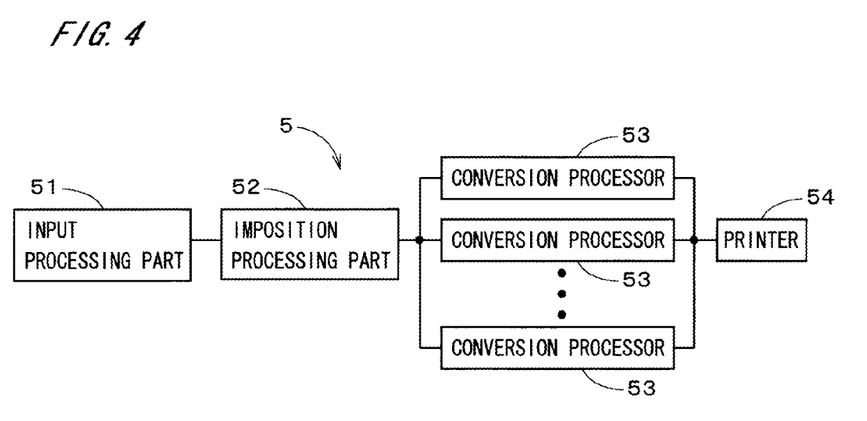
FIG. 4 is a block diagram illustrating a functional configuration of a printing system.

FIG. 4 is a block diagram roughly illustrating a functional configuration of a printing system 5 used in variable data printing. The printing system 5 serving as an image forming apparatus includes an input processing part 51 that receives input of page group data, which is received data in the variable data printing. An imposition processing part 52 performs imposition processing in which the layout of each page on an object such as printing paper is set, and inputs the processed page group data to a plurality of conversion processors 53 in which RIP processing is performed. In this embodiment, the conversion processors 53 provided in the printing system 5 are assumed to be different from the conversion processor 4 connected to the conversion time prediction part 2 in FIG. 2, but they may be the same conversion processors.

The RIP processing (i.e., conversion processing) performed on a plurality of page data pieces in the page group data is divided into a plurality of tasks, and the page group data is distributed to and processed by the plurality of conversion processors 53 (i.e., the load is balanced). Each of the conversion processors 53 converts page data pieces included in each task into drawing data for forming images, i.e., raster data in a format that can be output by a printer 54 (e.g., data in bitmap format or in 1-bit TIFF format). In parallel with the RIP processing performed by the conversion processors 53, the printer 54 consecutively prints (forms) images on an object in accordance with the generated drawing data.

Figure 5:
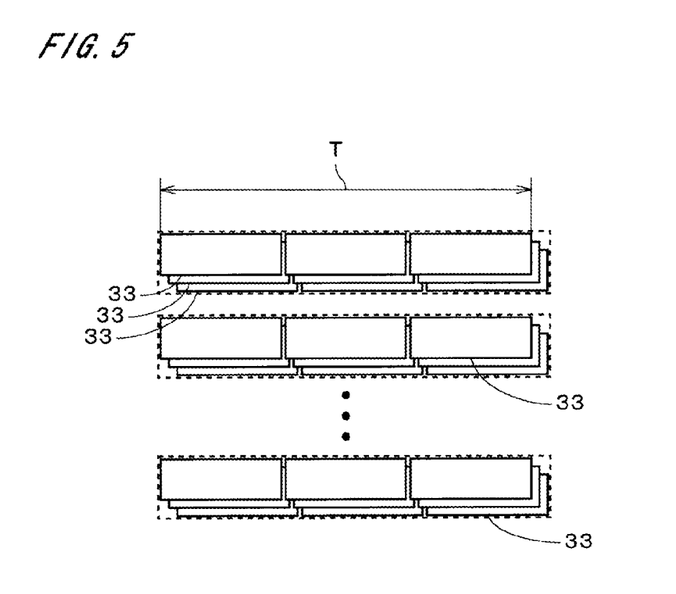
FIG. 5 is a diagram illustrating distributed processing performed by a plurality of conversion processors.

FIG. 5 is a diagram illustrating the distributed processing performed by the conversion processors 53. In FIG. 5, a set of page data pieces (hereinafter, referred to as an "actual data block") to be processed collectively as a single task by each conversion processor 53 is shown as a rectangle denoted by a reference numeral 33. A plurality of actual data blocks 33 to be processed by a single conversion processor 53 is enclosed by a broken-line rectangle in FIG. 5. In the case where the number of page data pieces included in each actual data block 33 is obtained, a value J is obtained from $(M/(K \times L \times n))$, where K is the number of conversion processors 53 in the printing system 5, L is the number of tasks each conversion processor 53 can process in parallel, and M is the number of page data pieces (the number of pages) included in the page group data. Note that the value J is made to be less than or equal to a predetermined maximum number of pages by adjusting the value of the positive integer n. The maximum number of pages is preset in order to avoid, for example, extra strain on the memory of each conversion processor 53 during RIP processing.

For instance, when the number of conversion processors 53 (K) is 8, the number of tasks each conversion processor 53 can process in parallel (L) is 3, the number of page data pieces included in the page group data (M) is 13832, and the maximum number of pages is 2000, the value J is 576.33 where n is set to 1. The value J is then rounded off to an even number greater than its current value of 576.33, that is, the value J is changed to 578. In this way, the number of page data pieces included in each actual data block 33, i.e., the number of page data pieces to be processed collectively as a single task (hereinafter, referred to as the "block page number") when the conversion processor 53 actually converts the page group data into drawing data, is determined to be 578. Since n=1, each conversion processor 53 processes only three tasks simultaneously in parallel.

However, if the number of page data pieces in every actual data block 33 (every task) is determined to be 578, the total number of page data pieces to be processed would be $(578 \times (8 \times 3 \times 1))=13872$, which is greater than 13832, i.e., the number of page data pieces included in the page data group. Thus, a value of 538 obtained by subtracting a difference between 13872 and 13832 (i.e., 40 (=13872−13832)) from 578 is determined to be the number of page data pieces included in one arbitrary actual data block 33.

When the number of conversion processors 53 (K) is 8, the number of tasks each conversion processor 53 can process in parallel (L) is 3, and the number of page data pieces included in the page group data (M) is 100000, the value J is 1388.89 where n is set to 3. The block page number, i.e., the number of page data pieces included in each actual data block 33, is thus 1390 (where the number of page data pieces in one arbitrary actual data block 33 is 1310). Each conversion processor 53 repeats parallel processing of three tasks three times as illustrated in FIG. 5. In this way, the value n in the above calculation indicates the number of times the parallel processing of tasks is repeated. A conversion processing time T required for RIP processing of the entire page group data is approximately three times the processing time of a single task.

Here, when a reusable component is reused in a plurality of page data pieces included in a single task (actual data block 33), each conversion processor 53 generates raster data of a component image from the reusable component through RIP processing performed on a page data piece in which the reusable component first appears in the task. The generated raster data can be reused as-is in the other page data pieces by being cached in memory. This increases the RIP processing speed. When the RIP processing of one task is completed, a storage area allocated for that task is reset in the memory of the conversion processor 53.

Meanwhile, in the case, for example, where the page group data includes few reusable components (i.e., components that are reusable but not reused), where reusable components are in a complicated nested relationship, or where a transparency effect is used for reusable components, raster data may not efficiently be reused as described above and accordingly the load applied to each conversion processor 53 increases or the time required for the RIP processing increases. Also, the RIP processing may be terminated due to an error. In this way, the appropriateness of page group data that takes into consideration, for example, the conversion processing time required for the RIP processing of the entire page group data, the load applied to each conversion processor 53, or the presence or absence of an error during RIP processing, depends greatly on the degree of reuse of reusable components included in the page group data, the nested relationship among the reusable components, or the content of the nested relationship. It is thus important to ascertain the appropriateness of page group data before the printing system 5 actually starts printing. Hereinafter, the processing performed in the conversion time prediction part 2 for enabling an operator to easily ascertain the appropriateness of the page group data 31 will be described with reference to FIG. 6.

In the processing performed in the conversion time prediction part 2 in FIG. 2, first, the page group data 31 stored in the storage part 3 is input to the target data analysis part 21. In this example of processing, the page group data 31 itself is the data to be processed by the conversion time prediction part 2 and is thus hereinafter referred to as the "target data 31." The target data analysis part 21 acquires the number of a plurality of page data pieces 32 (the number of pages) included in the target data 31 and compares the acquired number with a predetermined unit page number. Here, the unit page number is equal to the block page number, i.e., the number of pages to be processed as a single task when the conversion processors 53 actually perform RIP processing on the page group data 31, and it is determined whether or not the number of pages in the target data 31 is greater than or equal to the unit page number (step S11). The block page number in the page group data 31 is obtained using the technique described above with reference to FIG. 5. The unit page number may be the number of pages close to the block page number. In this case, the unit page number is preferably in the range of 70 to 130 percent of the block page number, and more preferably, in the range of 85 to 115 percent of the block page number.

Figure 6:
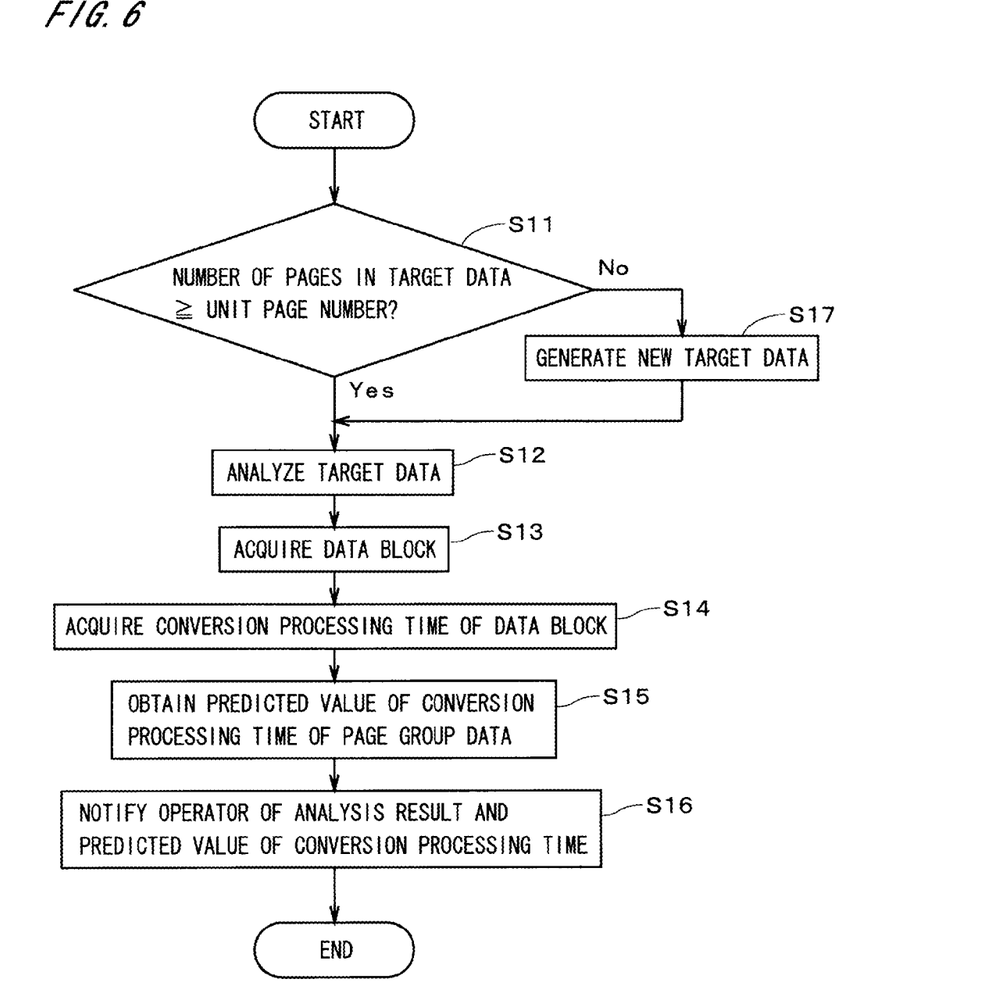
FIG. 6 is a flowchart of processing performed by a conversion time prediction part.

Next, the target data analysis part 21 analyzes the target data 31 (step S12). Specifically, the target data analysis part 21 specifies a plurality of page data pieces 32 that use one of the reusable components included in the target data 31, and further specifies the first page among a plurality of pages indicated by the page data pieces 32 as a page of interest (target page). The target data analysis part 21 performs the same processing on all reusable components included in the target data 31 to specify a plurality of target pages.

If there are few target pages, it indicates that many pages reuse reusable components and the degree of reuse of page components in the target data 31 is high. If there are many target pages, it indicates that the degree of reuse of page components is low. It can thus be said that the above processing performed by the target data analysis part 21 is for acquiring the degree of reuse of page components in the target data 31 as an analysis result. In the case where information (also called "resource") indicating the color, font, or the like is reusable among pages, a page that initially uses each resource may be handled as a target page. In other words, the target data analysis part 21 acquires at least the degree of reuse of page components in the target data 31 as an analysis result.

Next, the data block acquisition part 22 acquires a single set of page data pieces 32 in the target data 31 as a data block, the number of the page data pieces 32 corresponding to the unit page number (step S13). As described previously, because the unit page number is equal to or close to the block page number, the above data block is substantially equivalent to one actual data block 33 used in the distributed processing performed by the conversion processors 53. The data block is output to the external conversion processor 4 (the conversion processor for predicting a conversion time) by the conversion processing control part 23, and the conversion processor 4 converts the data block into drawing data for forming images. At this time, the conversion processing control part 23 acquires the time required for the conversion processor 4 to perform RIP processing as a conversion processing time (step S14). The (maximum) amount of memory used by the conversion processor 4 and the size of the drawing data are also output to the conversion processing control part 23. If an error has occurred during the RIP processing of the data block, the details of the error is also output to the conversion processing control part 23.

The conversion time calculation part 24 obtains a predicted value of a conversion processing time required for each conversion processor 53 provided in the printing system 5 to actually convert the page group data 31 into drawing data for forming images, on the basis of the conversion processing time of the data block acquired by the conversion processor 4 for predicting a conversion time (step S15). Specifically, the conversion processing time of the data block acquired by the conversion processor 4 is multiplied by a preset coefficient to obtain a task processing time required for a conversion processor 53 to perform processing of a single task (processing of an actual data block 33), because the processing capability of the conversion processor 4 used in the RIP processing of the data block differs from that of the conversion processors 53 provided in the printing system 5. In the case of the page group data 31, if the number of times the tasks are repeated, which has been described with reference to FIG. 5, is 1 (i.e., n=1), the predicted value of the conversion processing time would be approximately one time the task processing time, and if the number of times the tasks are repeated is 3, the predicted value of the conversion processing time would be approximately three times the task processing time.

When the predicted value of the conversion processing time has been obtained, the notification part 25 causes the display 16 to display the analysis result indicating the degree of reuse of page components in the target data 31 and the predicted value of the conversion processing time so as to notify the operator of the analysis result and the predicted value (step S16). In the conversion time prediction part 2, for example, a maximum number of target pages is set in advance, and if the number of target pages exceeds this maximum number, a warning message indicating that the degree of reuse of page components is low is displayed on the display 16. Also, if an error has occurred during RIP processing performed on a data block, the display 16 preferably displays the details of that error.

Note that the conversion processors 53 of the printing system 5 would have low RIP processing speeds if their amounts of memory used increase excessively. Thus, when the maximum amount of memory used by the conversion processor 4 for predicting a conversion time exceeds a predetermined maximum value, a warning message may be displayed on the display 16 together with the maximum amount of memory used. The RIP processing speeds would also be reduced if the size of the drawing data is excessively large because the capacities of the storage parts of the conversion processors 53 become scarce. Thus, when the size of the drawing data generated by the conversion processor 4 for predicting a conversion time exceeds a maximum value, a warning message may be displayed together with the size of the drawing data on the display 16.

The operator determines the appropriateness of the page group data 31 (target data 31) by checking the content displayed on the display 16, and if no problem is found, the printing system 5 performs printing using the page group data 31. If there is a problem with the page group data 31, for example, if the predicted value of the conversion processing time is relatively long, the relationship or the like of the usage of page components in the page group data 31 is analyzed using a predetermined technique while referencing, for example, the analysis result obtained by the target data analysis part 21, and the problem is appropriately corrected. Preferably, the processing of FIG. 6 is performed again on the corrected page group data to ascertain the appropriateness of the page group data before printing.

Meanwhile, when a set of some page data pieces 32 (also called sample data) in the page group data 31 is stored in the storage part 3 in FIG. 2, this sample data is handled as target data. In this case, it is determined in the processing of step S11 that the number of pages in the target data is smaller than the unit page number, and the target data analysis part 21 generates new target data (step S17).

Figure 7:
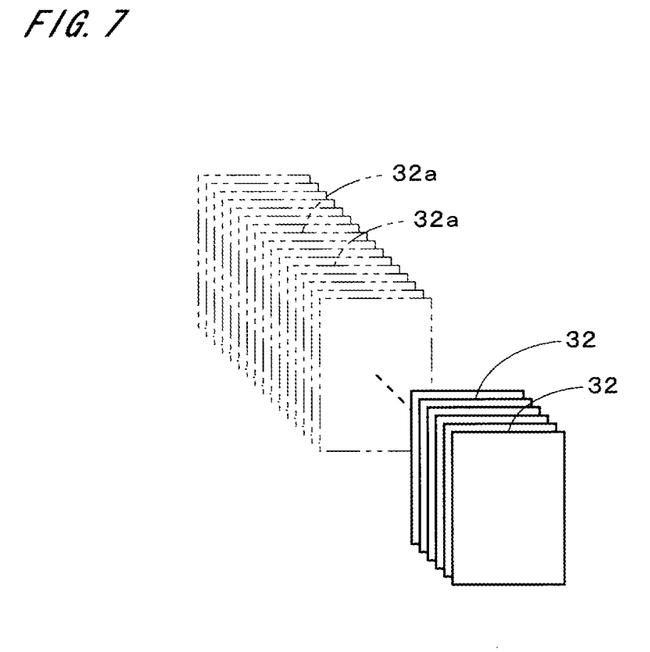
FIG. 7 is a diagram for explaining generation of new target data.
Figure 8:
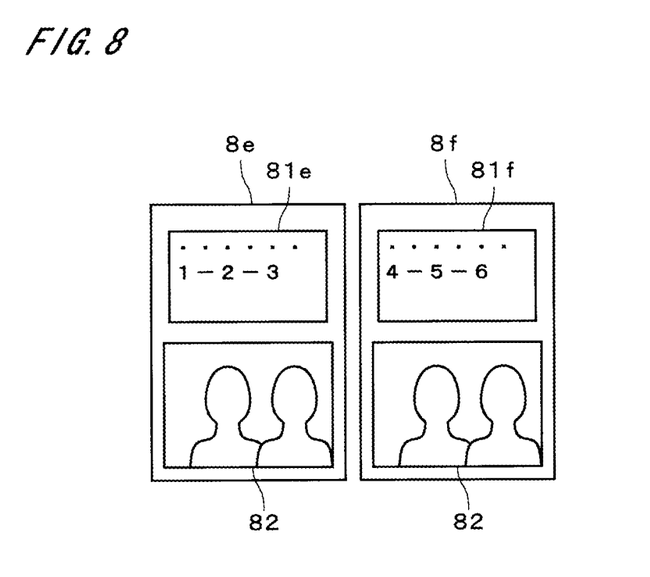
FIGS. 8 and 9 illustrate page images.

FIG. 7 is a diagram for explaining the generation of new target data and shows a plurality of page data pieces 32 in original target data as solid-line rectangles that are overlaid one upon another and denoted by the same reference numeral. FIG. 8 illustrates a plurality of page images 8e and 8f indicated by a plurality of page data pieces 32. Similarly to the page images 8a to 8d illustrated in FIG. 3, the page images 8e and 8f in FIG. 8 are represented by a plurality of component images. Specifically, the page images 8e and 8f respectively include component images 81e and 81f represented by variable components, the content of which differs from page to page, and both include a component image 82 represented by a reusable component that can be used in other pages.

Figure 9:
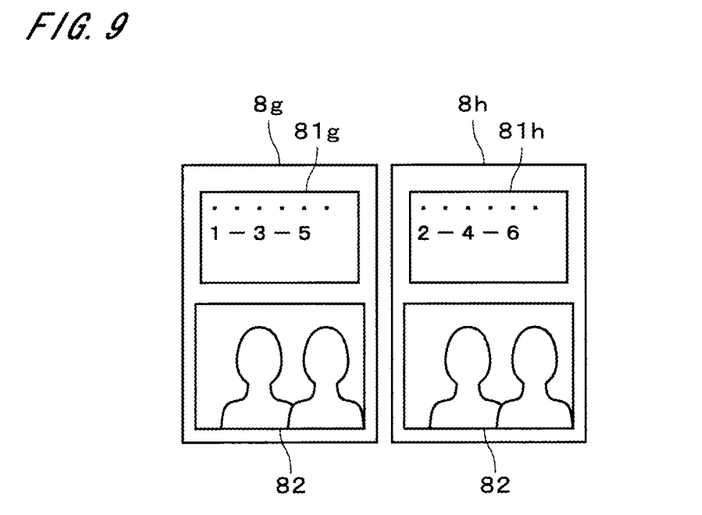

In generating new target data, a plurality of page data pieces 32 in original target data are copied to generate many new page data pieces (hereinafter, referred to as "copied page data pieces"). At this time, the copied page data pieces are generated by replacing the variable components in the original page data pieces 32 by new variable components having contents different from those of the original variable components. Accordingly, in page images 8g and 8h indicated by a plurality of copied page data pieces in FIG. 9, the contents of component images 81g and 81h represented by variable components are each different from the contents of component images represented by variable components in any other page data piece. As to reusable components, on the other hand, copied page data pieces include the same reusable component as the original page data pieces 32. The page images 8g and 8h include the same component image 82 as the page images 8e and 8f in FIG. 8. Note that the content of component image represented by a variable component in each copied page data piece does not necessarily have to be different from those in the other page data pieces as long as the variable component is handled as a different component from those in the other page data pieces in RIP processing (i.e., as long as raster data of the variable component is not cached in memory during RIP processing).

Many copied page data pieces are generated as described above and combined with the original page data pieces 32 to generate new target data that is a set of page data pieces, the number of which is greater than or equal to the unit page number. FIG. 7 shows such copied page data pieces as dashed double dotted-line rectangles that are overlaid one upon another and denoted by a reference numeral 32*a*. The new target data is subjected to the same processing of steps S12 to S16 as described above. In the processing of step S16, a message indicating that the new target data has been generated is preferably displayed on the display 16.

As described above, the conversion time prediction part 2 acquires a set of page data pieces in target data as a data block, the number of the page data pieces being same as the unit page number, and causes the external conversion processor 4 to convert the data block into drawing data for forming images, to acquire the conversion processing time of the data block. Then, a predicted value of a conversion processing time required for the conversion processor 53 provided in the printing system 5 to actually convert the page group data 31 into drawing data is obtained on the basis of the conversion processing time of the data block acquired by the conversion processor 4. It is thus possible to accurately obtain the predicted value of the conversion processing time of the page group data 31 that reflects the structure of reuse of reusable components included in the page group data 31, the nested relationship among the reusable components, the content of the nested relationship, or the like.

The degree of reuse of page components in the target data is also acquired as an analysis result, and the operator is notified of both the analysis result and the predicted value of the conversion processing time. The operator can thus easily ascertain the appropriateness of the page group data 31. As a result, a problem that may occur with the printing system 5 during actual printing can be ascertained in advance by the operator at a data generation site. It is also possible, by correcting page group data, to prevent the occurrence of a problem during actual printing. The conversion time prediction part 2 may, of course, be provided as part of the printing system 5 (i.e., may be included in a workflow system).

When the number of page data pieces 32 included in the target data is smaller than the unit page number, the target data analysis part 21 copies the page data pieces 32 while replacing page components that are not reused in the page data pieces 32 by new page components that are not reused. This produces new target data that is a set of page data pieces the number of which is greater than or equal to the unit page number and makes it possible to acquire the conversion processing time of a data block whose number of pages is close or equal to that of an actual data block used for actual printing performed by the printing system 5. Thus, the predicted value of the conversion processing time can be acquired with high accuracy.

Figure 10:
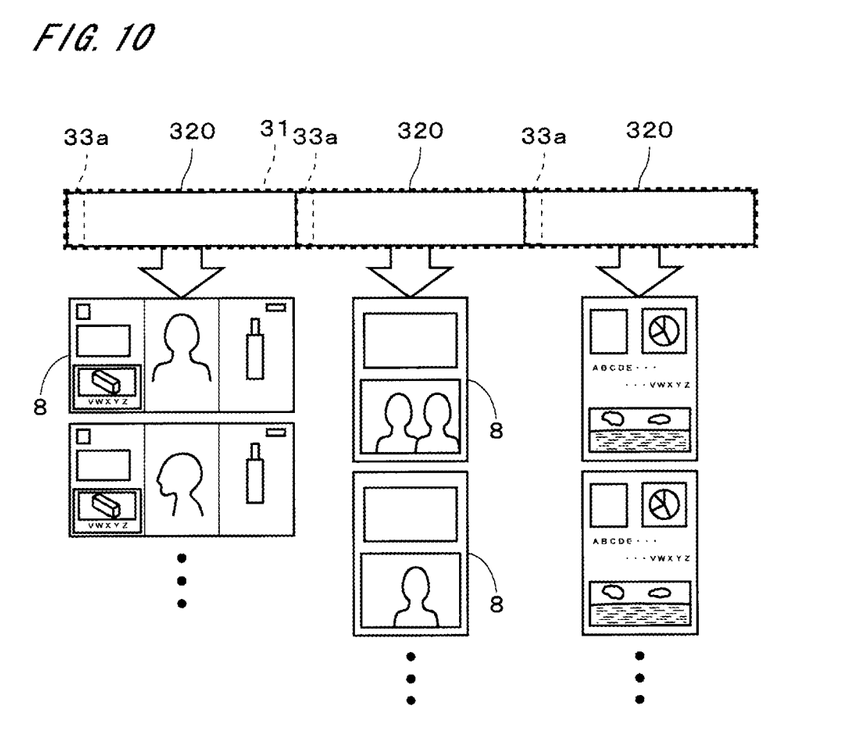
FIG. 10 shows an abstract representation of target data.

Next, another example of processing performed by the conversion time prediction part 2 will be described. FIG. 10 shows an abstract representation of the target data 31 as page group data and shows the target data 31 as a laterally elongated rectangle indicated by a broken line. Also, sets 320 of page data pieces 32 (hereinafter, referred to as "page data piece groups 320") are enclosed by solid-line rectangles, and at least one same page component (reusable component) is included (reused) in all of the page data pieces 32 of each set 320. A plurality of page images 8 indicated by a plurality of page data pieces 32 included in each page data piece group 320 are arranged in the longitudinal direction below that page data piece group 320. Note that in the variable data printing, RIP processing of a page data piece group 320 is taken as a single job.

When the target data 31 illustrated in FIG. 10 is input to the target data analysis part 21, it is determined that the number of pages in the target data 31 is greater than or equal to the unit page number (step S11 in FIG. 6), and then the target data 31 is analyzed (step S12). At this time, page components to be reused change at the boundary between each adjacent two of the page data piece groups 320 (i.e., the boundary between two page data piece groups 320 adjacent to each other) in FIG. 10, and therefore target pages are concentrated in pages that come immediately after the boundaries. In other words, target pages are concentrated in the first several pages in each page data piece group 320. The target data analysis part 21 thus specifies a position immediately before where target pages are concentrated as a boundary between each adjacent two of the page data piece groups 320. Alternatively, a position at which the font, page size, or the like indicated by a resource changes may be specified as the boundary between each adjacent two of the page data piece groups 320.

The data block acquisition part 22 handles each of the page data piece groups 320 specified by the target data analysis part 21 as a single piece of target data and acquires a data block through the same processing as described above (step S13). That is, one data block is acquired for each page data piece group 320. FIG. 10 illustrates a data block as a thin broken-line rectangle denoted by a reference numeral 33*a*. The conversion processing control part 23 acquires a conversion processing time of each data block (step S14), and the conversion time calculation part 24 obtains a predicted value of a conversion processing time of each page data piece group 320 (step S15). Then, the analysis result and the predicted value of the conversion processing time for each page data piece group 320 are displayed on the display 16 for notification to the operator (step S16).

As described above, when a page component to be reused in the target data 31 differs between a plurality of page data pieces 32 indicating a plurality of consecutive pages and another plurality of page data pieces 32 indicating another plurality of consecutive pages, the data block acquisition part 22 acquires a data block from the plurality of page data pieces 32 and acquires another data block from the other plurality of page data pieces 32. Thus, the operator can be easily notified of the predicted value of the conversion processing time for each job even if a plurality of page data piece groups 320 (a plurality of jobs) are included in the page group data 31 in order to use the whole roll of continuous form paper in the printer 54, for example.

While the above has been a description of an embodiment of the present invention, the present invention is not intended to be limited to the above-described embodiment, and may be modified in various ways.

The function of the conversion time prediction part 2 serving as a conversion time prediction apparatus may be used for purposes other than predicting a conversion processing time required to perform RIP processing for generating drawing data for printing. For example, in the case where plane group data indicating many image planes are converted into drawing data for forming images by a conversion processor provided in an image forming apparatus, the image planes being the main surfaces of substrates (e.g., semiconductor substrates, glass substrates, or printed circuit boards) or virtual planes (i.e., planes corresponding to pages) in which images of a pattern to be formed in areas obtained by dividing such main surfaces are disposed, the conversion time prediction part 2 may predict a conversion processing time required for the conversion into the drawing data. In this case, the conversion time prediction part 2 performs similar processing by replacing the pages, page group data, page data pieces, page components, and unit page number in the above-described embodiment respectively by image planes, plane group data, plane data pieces, plane components, and a unit plane number.

In other words, the target data analysis part 21 analyzes target data to acquire the degree of reuse of plane components in the target data as an analysis result, the target data being plane group data or a set of plane data pieces constituting part of the plane group data, and the plane components being included in the plane group data and reusable in plane data pieces each indicating one image plane. Also, the data block acquisition part 22 acquires a set of plane data pieces in the target data as a data block, the number of the set of plane data pieces corresponding to a unit plane number that is the number of planes equal to or close to the number of planes to be processed collectively (en bloc) as a single task when a conversion processor provided in an image forming apparatus actually converts the plane group data into drawing data for forming images. The conversion processing control part 23 causes a predetermined conversion processor to convert the data block into drawing data for forming images to acquire a conversion processing time. The conversion time calculation part 24 obtains a predicted value of a conversion processing time required for a conversion processor provided in the image forming apparatus to actually convert the plane group data into drawing data for forming images, on the basis of the conversion processing time of the data block. Then, the notification part 25 notifies the operator of the analysis result and the predicted value.

In this way, the conversion time prediction part 2 accurately obtains the predicted value of the conversion processing time of plane group data and notifies the operator of both the predicted value of the conversion processing time and the degree of reuse of plane components in the plane group data. This enables the operator to easily ascertain the appropriateness of the plane group data. Note that examples of the image forming apparatus for various types of substrates include drawing apparatuses using light beams or electron beams.

The configurations of the above-described preferred embodiments and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention. This application claims priority benefit under 35 U.S.C. Section 119 of Japanese Patent Application No. 2012-211918 filed in the Japan Patent Office on Sep. 26, 2012, the entire disclosure of which is incorporated herein by reference.

REFERENCE SIGNS LIST

1 Computer
2 Conversion time prediction part
4 Conversion processor
5 Printing system
11 CPU
13 RAM
21 Target data analysis part
22 Data block acquisition part
23 Conversion processing control part
24 Conversion time calculation part
25 Notification part
31 Page group data
32 Page data piece
53 Conversion processor (of printing system)
92 Program
320 Page data piece group
S11 to S16 Step

The invention claimed is:

1. A conversion time prediction apparatus for predicting a conversion processing time required for a conversion processor provided in an image forming apparatus to convert plane group data indicating a large number of image planes into drawing data for forming images, the apparatus comprising:
   a target data analysis part for analyzing target data to acquire a degree of reuse of a plane component in said target data as an analysis result, said target data being said plane group data or a set of plane data pieces constituting part of said plane group data, and said plane component being included in said plane group data and reusable in a plane data piece indicating each image plane;
   a data block acquisition part for acquiring a set of plane data pieces in said target data as a data block, the number of said set of plane data pieces corresponding to a unit plane number that is the number of planes equal to or close to the number of planes to be processed collectively as a single task when a conversion processor provided in an image forming apparatus actually converts said plane group data into drawing data for forming images;
   a conversion processing control part for causing a predetermined conversion processor to convert said data block into drawing data for forming images to acquire a conversion processing time;
   a conversion time calculation part for obtaining a predicted value of a conversion processing time required for the conversion processor provided in said image forming apparatus to actually convert said plane group data into drawing data for forming images, on the basis of the conversion processing time of said data block acquired by said predetermined conversion processor; and
   a notification part for notifying an operator of said analysis result and said predicted value.

2. The conversion time prediction apparatus according to claim 1, wherein
   when the number of a plurality of plane data pieces included in said target data is smaller than said unit plane number, said target data analysis part copies said plurality of plane data pieces while replacing plane components that are not reused in said plurality of plane data pieces by new plane components that are not reused, to generate new target data that is a set of plane data pieces the number of which is greater than or equal to said unit plane number.

3. The conversion time prediction apparatus according to claim 1, wherein
   when a plane component to be reused in said target data differs between a plurality of plane data pieces indicating a plurality of consecutive image planes and another plurality of plane data pieces indicating another plurality of consecutive image planes, said data block acquisition part acquires said data block from said plurality of plane data pieces and acquires another data block from said other plurality of plane data pieces.

4. The conversion time prediction apparatus according to claim 1, wherein when said predetermined conversion processor is different from the conversion processor provided in said image forming apparatus, said conversion time calculation part obtains said predicted value of said conversion processing time by multiplying the conversion processing time of said data block acquired by said predetermined conversion processor by a preset coefficient.

5. The conversion time prediction apparatus according to claim 1, wherein
said plane group data is written in a page description language, and
the drawing data for forming images is raster data.

6. A non-transitory computer-readable recording medium storing a program for causing a computer to predict a conversion processing time required for a conversion processor provided in an image forming apparatus to convert plane group data indicating a large number of image planes into drawing data for forming images, said program causing said computer to execute:
 a) analyzing target data to acquire a degree of reuse of a plane component in said target data as an analysis result, said target data being said plane group data or a set of plane data pieces constituting part of said plane group data, and said plane component being included in said plane group data and reusable in a plane data piece indicating each image plane;
 b) acquiring a set of plane data pieces in said target data as a data block, the number of said set of plane data pieces corresponding to a unit plane number that is the number of planes equal to or close to the number of planes to be processed collectively as a single task when a conversion processor provided in an image forming apparatus actually converts said plane group data into drawing data for forming images;
 c) causing a predetermined conversion processor to convert said data block into drawing data for forming images to acquire a conversion processing time;
 d) obtaining a predicted value of a conversion processing time required for the conversion processor provided in said image forming apparatus to actually convert said plane group data into drawing data for forming images, on the basis of the conversion processing time of said data block acquired by said predetermined conversion processor; and
 e) notifying an operator of said analysis result and said predicted value.

7. The recording medium according to claim 6, wherein
when the number of a plurality of plane data pieces included in said target data is smaller than said unit plane number, said operation a) involves copying said plurality of plane data pieces while replacing plane components that are not reused in said plurality of plane data pieces by new plane components that are not reused, to generate new target data that is a set of plane data pieces the number of which is greater than or equal to said unit plane number.

8. The recording medium according to claim 6, wherein
when a plane component to be reused in said target data differs between a plurality of plane data pieces indicating a plurality of consecutive image planes and another plurality of plane data pieces indicating another plurality of consecutive image planes, said operation b) involves acquiring said data block from said plurality of plane data pieces and acquiring another data block from said other plurality of plane data pieces.

9. The recording medium according to claim 6, wherein
when said predetermined conversion processor is different from the conversion processor provided in said image forming apparatus, said operation d) involves obtaining said predicted value of said conversion processing time by multiplying the conversion processing time of said data block acquired by said predetermined conversion processor by a preset coefficient.

10. The recording medium according to claim 6, wherein
said plane group data is written in a page description language, and
the drawing data for forming images is raster data.

11. A conversion time prediction method for predicting a conversion processing time required for a conversion processor provided in an image forming apparatus to convert plane group data indicating a large number of image planes into drawing data for forming images, the method comprising:
 a) analyzing target data to acquire a degree of reuse of a plane component in said target data as an analysis result, said target data being said plane group data or a set of plane data pieces constituting part of said plane group data, and said plane component being included in said plane group data and reusable in a plane data piece indicating each image plane;
 b) acquiring a set of plane data pieces in said target data as a data block, the number of said set of plane data pieces corresponding to a unit plane number that is the number of planes equal to or close to the number of planes to be processed collectively as a single task when a conversion processor provided in an image forming apparatus actually converts said plane group data into drawing data for forming images;
 c) causing a predetermined conversion processor to convert said data block into drawing data for forming images to acquire a conversion processing time;
 d) obtaining a predicted value of a conversion processing time required for the conversion processor provided in said image forming apparatus to actually convert said plane group data into drawing data for forming images, on the basis of the conversion processing time of said data block acquired by said predetermined conversion processor; and
 e) notifying an operator of said analysis result and said predicted value.

12. The conversion time prediction method according to claim 11, wherein
when the number of a plurality of plane data pieces included in said target data is smaller than said unit plane number, said operation a) involves copying said plurality of plane data pieces while replacing plane components that are not reused in said plurality of plane data pieces by new plane components that are not reused, to generate new target data that is a set of plane data pieces the number of which is greater than or equal to said unit plane number.

13. The conversion time prediction method according to claim 11, wherein
when a plane component to be reused in said target data differs between a plurality of plane data pieces indicating a plurality of consecutive image planes and another plurality of plane data pieces indicating another plurality of consecutive image planes, said operation b) involves acquiring said data block from said plurality of plane data pieces and acquiring another data block from said other plurality of plane data pieces.

14. The conversion time prediction method according to claim 11, wherein when said predetermined conversion processor is different from the conversion processor provided in said image forming apparatus, said operation d) involves obtaining said predicted value of said conversion processing time by multiplying the conversion processing time of said data block acquired by said predetermined conversion processor by a preset coefficient.

15. The conversion time prediction method according to claim 11, wherein said plane group data is written in a page description language, and the drawing data for forming images is raster data.

* * * * *